May 26, 1953 R. O. BILLINGS 2,639,937
GRAPPLE
Filed April 11, 1949 3 Sheets-Sheet 1
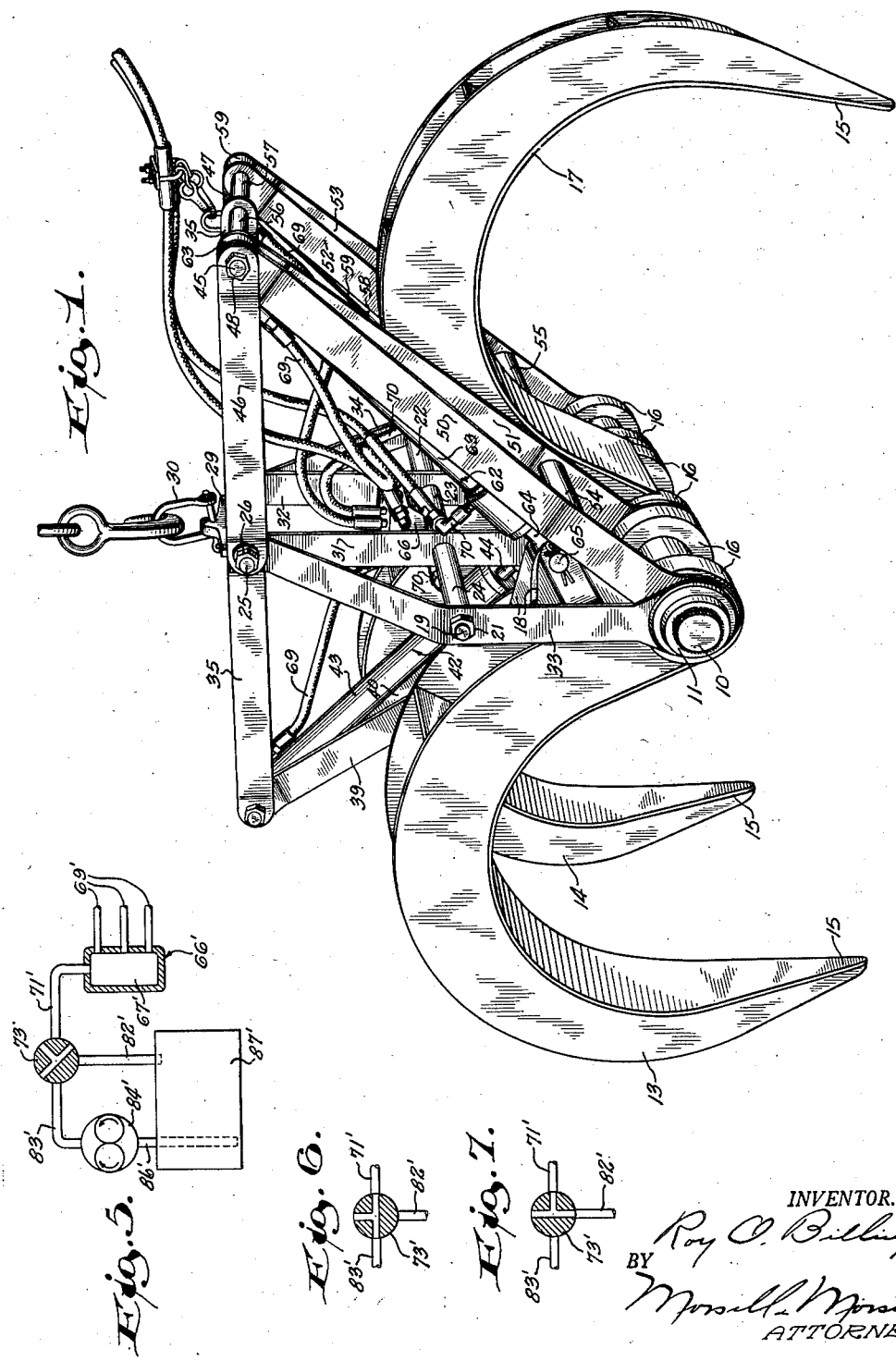
INVENTOR.
Roy O. Billings
BY
Morsell & Morsell
ATTORNEYS.

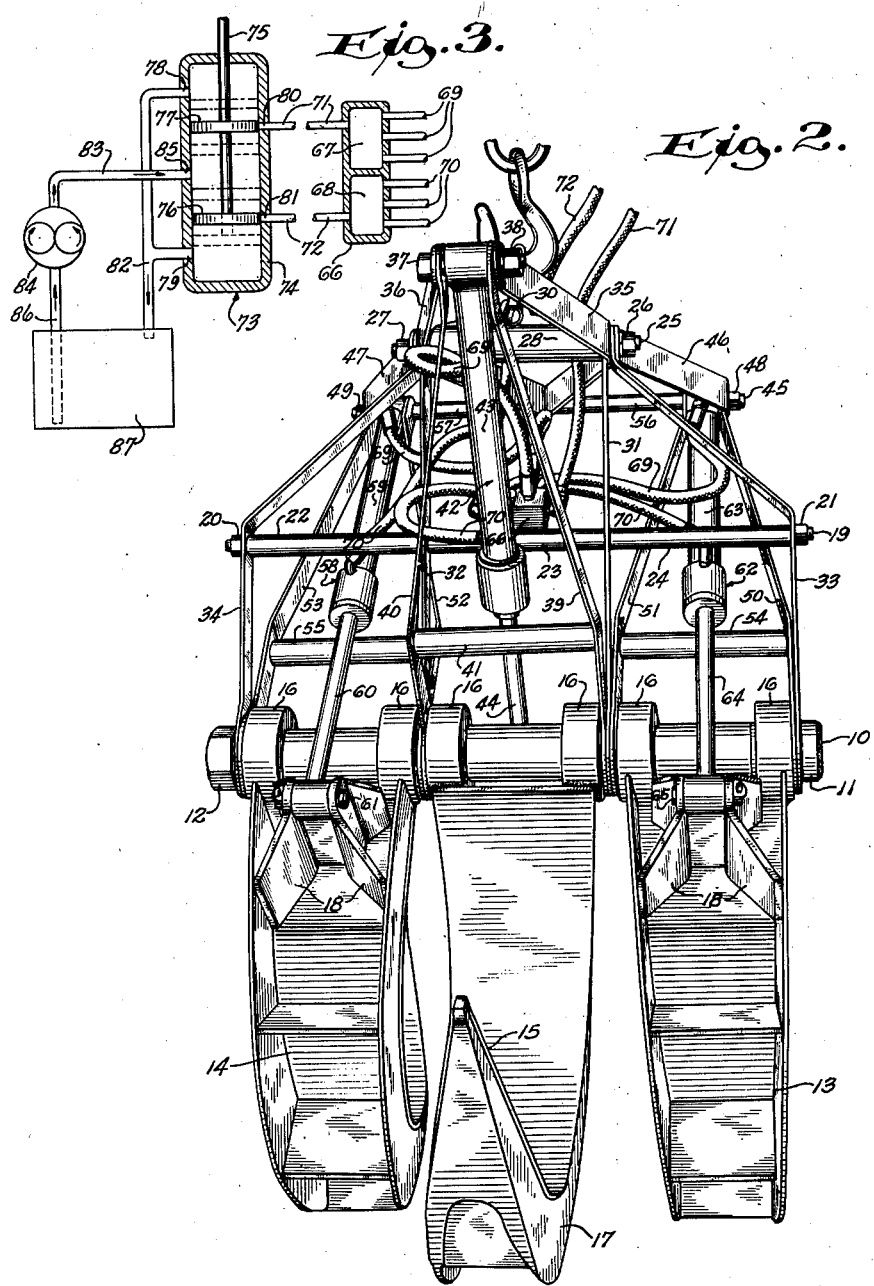

May 26, 1953  R. O. BILLINGS  2,639,937
GRAPPLE

Filed April 11, 1949  3 Sheets-Sheet 3

INVENTOR.
Roy O. Billings
BY
Morsell & Morsell
ATTORNEYS.

Patented May 26, 1953

2,639,937

UNITED STATES PATENT OFFICE 2,639,937

GRAPPLE

Roy O. Billings, Milwaukee, Wis.

Application April 11, 1949, Serial No. 86,690

11 Claims. (Cl. 294—88)

This invention relates to improvements in grapples.

In various industries it is necessary to handle elongated material such as logs, rail ties, mine braces and the like. Hertofore no entirely satisfactory equipment has been available for this purpose and resort has usually been had to inefficient, and slow devices such as slings.

It is therefore a general object of the invention to provide an improved grapple for efficiently handling materials, the units of which are elongated in shape.

A further object of the invention is to provide an improved grapple which operates efficiently on material having a wide range of cross-sectional sizes.

A further object of the invention is to provide an improved grapple for handling elongated material wherein engagement with said material is accomplished by embracing it between side portions of oppositely acting tines rather than by biting into it with the points of said tines as in the case of tong-like grapples.

A further object of the invention is to provide a grapple of the class described having at least three arcuate tines mounted for swinging movement on a common axis, two of said tines facing in one direction and the third being positioned between said first mentioned pair of tines and facing in the opposite direction.

A further object of the invention is to provide an improved grapple of the class described wherein the tines are actuated by hydraulic rams rather than by cables, chains, or the like.

A further object of the invention is to provide a grapple of the class described which is strong and durable, which is simple in construction and easy to manufacture, and which is otherwise well adapted for the purpose described.

With the above and other objects in view, the invention consists of the improved grapple, and all of its parts and combinations, as set forth in the claims, and all equivalents thereof.

In the drawings accompanying and forming a part of this specification wherein are shown two embodiments of the invention, and wherein the same reference characters indicate the same parts in all of the views:

Fig. 1 is a perspective side view of the preferred form of the invention showing the tines in open position;

Fig. 2 is a perspective end view of the preferred form of the invention showing the tines in closed position;

Fig. 3 is a diagrammatic view showing an hydraulic control system for the preferred form of the invention;

Fig. 5 is a diagrammatic view showing an hydraulic control system for the form of the invention shown in Fig. 4;

Fig. 6 is a diagrammatic view showing the control valve of Fig. 5 in a second position; and Fig. 7 is a view similar to Fig. 6 showing the control valve in a third position.

Figure 4:
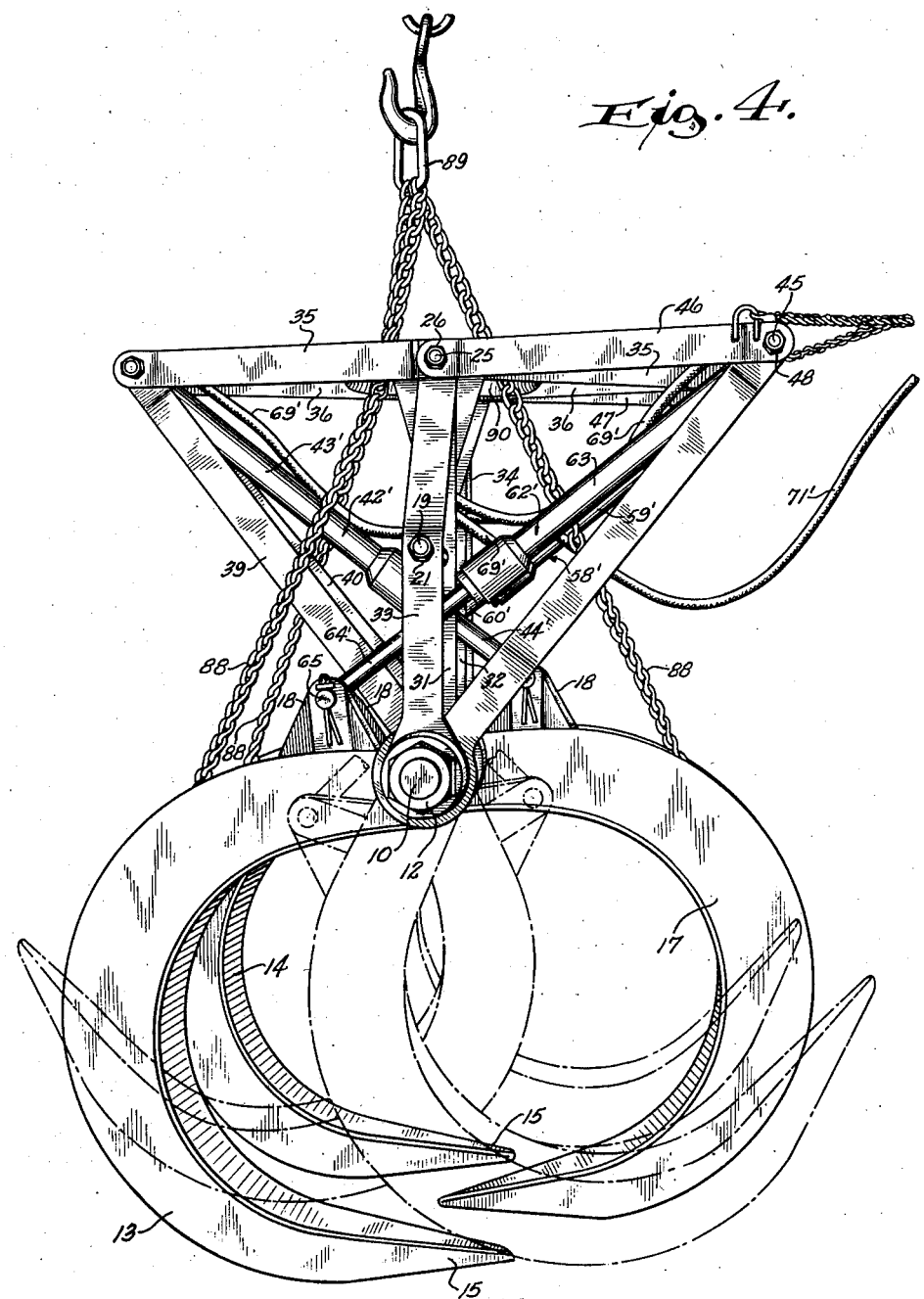
Fig. 4 is a perspective side view of a modified form of the invention showing the tines in intermediate position.

Referring more particularly to Figs. 1 and 2 of the drawings, the numeral 10 indicates a horizontally extending shaft having an integral head 11 at one end and having a nut 12 threaded on the opposite end thereof. A pair of spaced parallel U-shaped tines 13 and 14 each having one end formed with a bearing 16 and each having its other end pointed as at 15 are pivotally mounted on the shaft 10 for swinging movement in a vertical plane.

The tines 13 and 14 have their pointed ends facing in the same direction. A third tine 17 which is substantially identical to the tines 13 and 14 is pivotally mounted on the shaft 10 between said tines 13 and 14 and has its pointed end facing in a direction opposite to that of said tines. The tine 17 is also swingable in a vertical plane. Each of the tines 13, 14 and 17 is formed on its upper side adjacent the bearings 16 with a pair of spaced, upstanding apertured ears 18.

Spaced above and parallel with the shaft 10 is an elongated bolt 19 which is threaded at both ends to receive the nuts 20 and 21. Positioned on the bolt 19 are elongated tubular spacers 22, 23 and 24. Spaced above and parallel with the bolt 19 and with the shaft 10 is a second bolt 25 which is preferably shorter and which is threaded at both ends to receive nuts 26 and 27. Positioned on the bolt 25 is a tubular spacer 28 which is similar to the spacers 22, 23 and 24. The spacer 28 has fixed thereto, as by welding, an apertured bracket 29 to which may be attached a clevis 30 to provide a suspension means.

A pair of straight, spaced, parallel and vertically extending members 31 and 32 have their lower ends enlarged and apertured to receive the shaft 10, and are formed at the opposite end, intermediate their length, with apertures to receive the bolts 25 and 19 respectively. It will be noted that the member 32 passes between the spacers 22 and 23, and that the member 31 passes between the spacers 23 and 24.

A pair of spaced, vertically extending members 33 and 34 have their lower ends enlarged and apertured to receive the shaft 10, and are also apertured at their opposite ends and at points intermediate their length. The members 33 and 34 extend vertically and parallel to the members 31 and 32 from their lower ends to a location adjacent the outer ends of the spacers 22 and 24 and slightly beyond the bolt 19, the latter being received in the intermediate apertures. The members 33 and 34 extend upwardly and inwardly from the bolt 19 to receive the bolt 25 adjacent the upper ends of the members 31 and 32 respectively.

A pair of bar members 35 and 36 are apertured intermediate their length and at both ends. The members 35 and 36 receive the bolt 25 in the intermediate apertures thereof adjacent the outer ends of the spacer 28 and the members extend horizontally in opposite directions from said bolt. The outer ends of the members 35 and 36 converge toward each other. The left-hand ends of said bars, as viewed in Fig. 1, receive a relatively short bolt 37 on which is threaded a nut 38. The opposite ends of the bars 35 and 36 receive an intermediate portion of an elongated horizontally extending bolt 45.

Connected at one end to the bolt 37 and extending divergingly downwardly and inwardly, are bars 39 and 40. The latter have enlarged apertured lower ends to receive the shaft 10 and are located one on each side of the tine 17. The bars 39 and 40 are preferably provided with a horizontally extending spacing and reinforcing member 41 suitably fixed thereto as by welding.

A hydraulic ram 42 which is preferably double acting has a cylinder 43 and a piston rod 44. The outer end of the piston rod is pivotally connected to the spaced apertured ears 18 of the tine 17 through a suitable pin (not shown). The opposite end of the cylinder 43 is pivotally connected to the bolt 37 between the bars 36 and 40, and 35 and 39.

A pair of bars 46 and 47 are connected to the bolt 25 adjacent the outer ends thereof and extend divergingly and horizontally toward the ends of the elongated bolt 45 to which they are connected. Threaded on the outer ends of the bolt 45 are nuts 48 and 49. Two pairs of bars 50 and 51, and 52 and 53, which are substantially identical to the members 39 and 40 are connected at their upper ends to the outer ends of the bolt 45 and then extend downwardly and inwardly to receive the shaft 10 in their lower ends. The lower ends of the members 50 and 51 are positioned at each side of the tine 13, and the lower ends of the bars 52 and 53 are similarly related to the tine 14. Spacing and reinforcing members 54 and 55 are fixed to the bars 50 and 51, and 52 and 53 respectively as shown. Tubular spacing members 56 and 57 are positioned on the bolt 45.

A hydraulic ram 58 which is preferably double acting has a cylinder 59 and a piston rod 60. The outer end of the piston rod 60 is pivotally connected to the upstanding ears 18 of the tine 14 through a pin 61. The opposite end of the cylinder 59 is pivotally connected to the bolt 45 between the bars 52 and 53.

A hydraulic ram 62 which is preferably double acting has a cylinder 63 and a piston rod 64. The outer end of the piston rod 64 is pivotally connected to the upstanding ears 18 of the tine 13 through a pin 65. The opposite end of the cylinder 63 is preferably pivotally connected to the bolt 45 between the bars 50 and 51.

Fixed, as by welding, to the tubular member 23 is a manifold 66. Referring to Fig. 3 it will be noted that the manifold 66 is formed with two separate chambers 67 and 68. Referring again to Figs. 1 and 2 it will be noted that a separate conduit 69 communicates at one end with the upper end of each of the cylinders 43, 59 and 63. Each of the conduits 69 communicates at its opposite end with the chamber 67 of the manifold 66 as shown in Fig. 3. A separate conduit 70 communicates at one end with the lower end of each of the cylinders 43, 59 and 63, and each of said conduits communicates at its opposite end with the chamber 68 of the manifold 66 as shown in Fig. 3. Conduits 71 and 72 respectively communicate at one end with the chambers 67 and 68 of the manifold 66 and extend to a suitable control valve 73, which, in turn, communicates with a source of fluid pressure.

Fig. 3 illustrates one form of hydraulic control system. The valve 73 may be of any suitable type, the one shown being illustrative only. The valve 73 has a hollow cylindrical body 74 through one end wall of which a valve stem 75 slidably projects. Fixed to the stem 75 are a pair of spaced discs 76 and 77 which are slidable in the cylindrical bore of the body 74. The body 74 is formed with ports 78 and 79 near each end, and with ports 80 and 81 inwardly of the ports 78 and 79. The ports 80 and 81 are preferably spaced apart the same distance as the discs 76 and 77, and when the stem 75 is in the neutral position of Fig. 3, the discs 76 and 77 close off the ports 80 and 81. Conduit 71 communicates with the port 80 and the conduit 72 communicates with the port 81. A conduit 82 communicates with the ports 78 and 79. A conduit 83 leads from a suitable source of fluid pressure such as a gear pump 84, and communicates with a port 85 in the body 74, said port being positioned between the ports 80 and 81. A conduit 86 provides an inlet for the pump 84 and communicates with a suitable sump or reservoir 87. The conduit 82 also communicates with the reservoir 87.

When the valve stem 75 is in the position of Fig. 3 no fluid can flow through the conduits 71 and 72 and hence the piston rods 44, 60 and 64 are locked against movement, as are the tines 13, 14 and 17. Movement of the stem 75 to the dot and dash line position of Fig. 3 permits fluid under pressure to flow from the pump 84 through the conduit 83, 71, chamber 67, and conduits 69 to the upper ends of the cylinders 43, 59 and 63. This causes the piston rods to extend and move the tines 13 and 14 in a counterclockwise direction, as viewed in Fig. 1 while moving the tine 17 in the opposite direction. This movement tends to bring the tines to the position of Fig. 2. While the piston rods are being extended, return fluid flows from the lower ends of the cylinders 43, 59 and 63 through the conduits 70, chamber 68, conduit 72, and conduit 82 back to the reservoir 87.

To move the tines in the opposite direction it is only necessary to move the valve stem 75 to the dash line position of Fig. 3. This permits fluid under pressure to flow from the conduit 83, through conduit 72, chamber 68 and conduits 70 to the lower ends of the cylinders 43, 59 and 63. This causes retractive movement of the piston rods and causes the tines to move outwardly toward the position of Fig. 1.

In operation, the complete assembly disposed as shown in Fig. 1 is lowered onto the material to be handled. This material is ordinarily in the form of substantially parallel elongated units, such as a pile of poles, mine braces or the like. The stem 75 of the control valve 73 is then moved to the dot and dash line position of Fig. 3 causing the tines to be moved downwardly and inwardly into embracing relationship with a number of the elongated units of material. The amount of material picked up may vary with the diameter thereof. The tines may stop in the position of Fig. 4 or they may, if only one or a few units are to be picked up, move on to the dot and dash line position of the tines in Fig. 4. The capacity of the improved grapple is limited only by the radius of curvature of its tines. The ability of the tines to move to the dot and dash line position of Fig. 4 is of great advantage because it greatly enlarges the range of use.

Fig. 4 shown a modified form of the invention wherein single acting rams 42', 58' and 63' are used in place of the double acting rams 42, 58 and 63 of the preferred forms. In addition, the modified form of the invention embodies therein chains 88 which are each suitably connected at one end to an outer portion of a tine and which extend upwardly and inwardly to connect with a link 89. The chains 88 project through a suitable fairlead 90 which is fixed adjacent the inner surfaces of the bars 35 and 36 to guide the movement of said chains. As shown, the modified grapple assembly can be suspended from the link 89.

In the modified form of the invention the rams are connected with the conduits 69' only. These conduits also communicate with a modified form of manifold 66' having a single chamber 67' as shown in Fig. 5. A conduit 71' communicates with the chamber 67' and with a modified form of valve 73'. The valve 73' is connected to a gear pump 84' through a conduit 83' and is connected to a reservoir 87' through a conduit 82'. A conduit 86' provides an inlet for the pump 84' leading from the reservoir 87'.

As shown in Fig. 5, the valve 73' is a three way type, and when it is in the position of Fig. 5 no fluid can flow through the conduit 71'. Consequently the piston rods 44' as well as the tines are locked against movement.

To cause closing movement of the tines the valve 73' is moved to the position of Fig. 6. This permits fluid under pressure to flow through the conduit 71', chamber 67' and conduits 69' to the rams 42', 58' and 62' thereby causing outward movement of the piston rods. Opening movement of the tines is accomplished by moving the valve 73' to the position of Fig. 7. This permits fluid to flow from the rams back to the reservoir 87' through the conduits 69', chamber 67', conduit 71' and conduit 82'. Since the weight of the entire assembly is supported through the chains 88, the piston rods 44', 60' and 64' are urged into the cylinders 43', 59' and 63' by the force of gravity. The fluid in the cylinders is, therefore, under constant pressure and tends to flow back to the reservoir when given the opportunity. It is obvious that the pressure built up by the pump 84' must overcome the pressure due to gravity in order to cause closing movement of the tines when the valve 73' is in the position of Fig. 5.

Various changes and modifications may be made without departing from the spirit of the invention, and all of such changes are contemplated as may come within the scope of the claims.

What I claim is:

1. A grapple comprising a head; at least two spaced arcuate tines having ends which project in the same direction pivotally connected to the lower end of said head for swinging movement in vertical planes; at least one arcuate tine having an end which projects in the opposite direction pivotally connected to the lower end of the head for swinging movement in a plane substantially parallel with and between the planes of movement of said first-mentioned tines; fluid pressure operated means including a separate hydraulic ram supported on said head and connected to each of said tines for causing swinging movement of said tines with at least one tine moving oppositely to the others and means for controlling the simultaneous operation of the tines.

2. A grapple comprising a head; shaft means fixed to said head at least two spaced arcuate tines having free ends which project in the same direction pivotally connected at their other ends to said shaft means for free swinging movement in vertical planes; at least one arcuate tine having a free end which projects in the opposite direction pivotally connected at its other end to said shaft means for free swinging movement in a plane substantialy parallel with and between the planes of movement of said first-mentioned tines; fluid pressure operated means including a separate hydraulic ram supported on said head and connected to each of said tines for causing swinging movement of said tines with at least one tine moving oppositely to the others and means for controlling the simultaneous operation of the tines.

3. A grapple comprising a head; at least two spaced arcuate tines having ends which project in the same direction pivotally connected to the lower end of said head for swinging movement in vertical planes; at least one arcuate tine having an end which projects in the opposite direction pivotally connected to the lower end of the head for swinging movement in a plane substantially parallel with and between the planes of movement of said first-mentioned tines, the pivots for all of said tines being coaxial; and fluid pressure operated means supported on said head and connected to said tines for causing simultaneous swinging movement of said tines with at least one tine moving oppositely to the others.

4. A grapple comprising a supporting head; at least two spaced arcuate tines having ends which project in the same direction pivotally connected to the lower end of said supporting head for swinging movement in vertical planes; at least one arcuate tine having an end which projects in the opposite direction pivotally connected to the lower end of the supporting head for swinging movement in a plane substantially parallel with and between the planes of movement of said first-mentioned tines; and means including a separate hydraulic ram for each of said tines for causing swinging movement thereof, each ram having one of its ends connected to its tine and having its other end connected to the supporting head.

5. A grapple comprising a supporting head; at least two spaced arcuate tines having ends which project in the same direction pivotally connected to the lower end of said supporting head for swinging movement in vertical planes; at least one arcuate tine having an end which projects in the opposite direction pivotally connected to the lower end of the supporting head for swinging movement in a plane substantially parallel with and between the planes of movement of said first-mentioned tines; and means including a separate double-acting hydraulic ram for each of said tines for causing swinging movement thereof, each ram having one of its ends connected to its tine and having its other end connected to the supporting head.

6. A grapple comprising a supporting head; at least two spaced arcuate tines having ends which project in the same direction pivotally connected to the lower end of said supporting head for swinging movement in vertical planes; at least one arcuate tine having an end which projects in the opposite direction pivotally connected to the lower end of the supporting head for swinging movement in a plane substantially parallel with and between the planes of movement of said first-mentioned tines; and a separate hydraulic ram for each of said tines, said rams each having a cylinder connected to said supporting head and having a downwardly extensible piston rod connected to one of said tines for causing swinging movement of said tine as said piston rod is moved.

7. A grapple comprising a head; at least two spaced arcuate tines having free ends which project in the same direction pivotally connected to the lower end of said head for swinging movement in vertical planes; at least one arcuate tine having an end which projects in the opposite direction pivotally connected to the lower end of the head for swinging movement in a plane substantially parallel with and between the planes of movement of said first-mentioned tines; suspension chains connected to said tines for normally holding said tines in open position with the free end of each tine disposed substantially entirely outwardly of the vertical plane through its axis of pivotal movement; and fluid pressure operated means supported on said head and connected to said tines for moving said tines to a closed position.

8. A grapple comprising a head; at least two spaced arcuate tines having free ends which project in the same direction pivotally connected to the lower end of said head for swinging movement in vertical planes; at least one arcuate tine having an end which projects in the opposite direction pivotally connected to the lower end of the head for swinging movement in a plane substantially parallel with and between the planes of movement of said first-mentioned tines; suspension chains connected to said tines for normally holding said tines in open position with the free end of each tine disposed substantially entirely outwardly of the vertical plane through its axis of pivotal movement; and fluid pressure operated means supported on said head and connected to said tines for moving said tines to a closed position wherein the free end of each tine is disposed substantially inwardly of said plane.

9. A grapple comprising a supporting frame having downwardly converging members; at least two spaced arcuate tines having free ends which project in the same direction pivotally connected to the lower ends of said downwardly converging members for swinging movement in vertical planes; at least one arcuate tine having an end which projects in the opposite direction pivotally connected to the lower ends of said downwardly converging members for swinging movement in a plane substantially parallel with and between the planes of movement of said first-mentioned tines; and means including a separate hydraulic ram for each of said tines for causing swinging movement thereof, each ram having one of its ends connected to the supporting frame adjacent the upper end of one of the converging members and having its other end connected to its tine.

10. A grapple comprising a supporting frame having downwardly converging members; at least two spaced arcuate tines having free ends which project in the same direction pivotally connected to the lower ends of said downwardly converging members for swinging movement in vertical planes; at least one arcuate tine having an end which projects in the opposite direction pivotally connected to the lower ends of said downwardly converging members for swinging movement in a plane substantially parallel with and between the planes of movement of said first-mentioned tines; and means including a separate hydraulic ram for each of said tines for causing swinging movement thereof, each ram having one of its ends connected to the supporting frame adjacent the upper end of one of the converging members and having its other end connected to its tine, at least one ram having its upper end positioned oppositely on the frame to the upper ends of the other rams and extending in downwardly converging relationship with respect to said other rams.

11. A grapple, comprising: a frame; at least two spaced arcuate tines having free ends which project in the same direction pivotally connected to the frame for swinging movement in vertical planes; at least one arcuate tine having an end which projects in the opposite direction pivotally connected to the frame for swinging movement in a vertical plane; suspension members connected to said tines by which said grapple is suspended, said members normally holding said tines in open position; and fluid pressure operated means connected between said frame and tines for moving said tines to closed position.

ROY O. BILLINGS.

References Cited in the file of this patent

UNITED STATES PATENTS

| Number | Name | Date |
| --- | --- | --- |
| 907,272 | McKinley et al. | Dec. 22, 1908 |
| 1,156,247 | Murrey | Oct. 12, 1915 |
| 1,307,009 | Joy | June 17, 1919 |
| 1,346,160 | Barlow | July 13, 1920 |
| 1,392,230 | Shade | Sept. 27, 1921 |
| 2,412,845 | Stevens | Dec. 17, 1946 |
| 2,491,806 | Frantz | Dec. 20, 1949 |